US008923615B2

(12) United States Patent
Schummers

(10) Patent No.: US 8,923,615 B2
(45) Date of Patent: Dec. 30, 2014

(54) METHOD AND DEVICE FOR SEGMENTING MEDICAL IMAGE DATA

(75) Inventor: Georg Schummers, Munich (DE)

(73) Assignee: Tomtec Imaging Systems GmbH (DE)

( * ) Notice: Subject to any disclaimer, the term of this patent is extended or adjusted under 35 U.S.C. 154(b) by 799 days.

(21) Appl. No.: 12/917,798

(22) Filed: Nov. 2, 2010

(65) Prior Publication Data

US 2011/0103661 A1    May 5, 2011

(30) Foreign Application Priority Data

Nov. 5, 2009   (EP) ..................................... 09175113

(51) Int. Cl.
*G06K 9/34*    (2006.01)
*G06T 19/00*   (2011.01)

(52) U.S. Cl.
CPC ...................................... *G06T 19/00* (2013.01)
USPC ........................................................ 382/173

(58) Field of Classification Search
CPC ..... G06T 7/0089; G06T 15/205; G06T 15/06; G06T 7/2006; G06T 15/08; G06T 13/20; G06T 7/0067; G06T 17/10; G06T 7/0051; G06T 5/001; G06T 2207/10028; G06T 17/00; G06T 17/20; G06T 2200/08; G06F 17/50; G06K 9/00624; G02B 27/2214; G04N 13/00; G04N 13/0011; H04N 13/0022; H04N 13/0018
USPC .................. 382/173, 180, 128, 134
See application file for complete search history.

(56) References Cited

U.S. PATENT DOCUMENTS 5,621,872 A    4/1997   Tokumasu et al.
(Continued)

FOREIGN PATENT DOCUMENTS

| DE | 10339979 | 4/2005 |
|---|---|---|
| JP | 11108630 | 4/1999 |
| WO | 2005031655 | 4/2005 |

OTHER PUBLICATIONS

Jan Erik Solem et al: "Reconstructing Open Surfaces from Image Data" International Journal of Computer Vision, Kluwer Academic Publishers, BO LNKD-DOI:10.1007/S11263-006-7068-9, Bd. 69, Nr. 3, May 1, 2006; 267-275; XP019410144.

(Continued)

*Primary Examiner* — Edward Park
(74) *Attorney, Agent, or Firm* — Cantor Colburn LLP

(57) ABSTRACT

The present invention relates to a method and device for automatical segmentation of medical images of a non-planar surface of an object, in particular of a heart valve, including detecting a surface boundary which delimits the non-planar surface of the object, creating a model surface, which is spanned between the surface boundary, correcting the model surface by means of distance information containing information about the distance between the model surface and the non-planar surface of the object, until a corrected model surface is generated, and depicting the corrected model surface, where the correction of the model surface is preferably carried out by means of three- or four-dimensional image data sets, by orienting the three-dimensional volume-rendering of the object essentially perpendicular to the model surface, so that the information about the distance between the model surface and the non-planar surface of the object can be evaluated, until the corrected model surface has been produced.

10 Claims, 3 Drawing Sheets

(56) References Cited

U.S. PATENT DOCUMENTS

| | | | |
|---|---|---|---|
| 6,106,466 A * | 8/2000 | Sheehan et al. | 600/443 |
| 7,453,455 B2 * | 11/2008 | Park et al. | 345/419 |
| 7,809,455 B2 * | 10/2010 | Kanai et al. | 700/98 |
| 7,990,379 B2 * | 8/2011 | Aharon et al. | 345/424 |
| 2004/0267125 A1 | 12/2004 | Skyba et al. | |
| 2005/0018891 A1 * | 1/2005 | Barfuss et al. | 382/131 |
| 2006/0239527 A1 * | 10/2006 | Krishnan et al. | 382/128 |
| 2006/0239528 A1 | 10/2006 | Camus et al. | |
| 2008/0154952 A1 | 6/2008 | Waldinger et al. | |
| 2009/0136107 A1 * | 5/2009 | Arnold et al. | 382/131 |

OTHER PUBLICATIONS

Votta E et al: :From real-time 3D echocardiography to mitral valve finite element analysis: A novel modeling approach Computers in Cardiology, 2008, IEEE, Piscataway, NJ, USA; Sep. 14, 2008, 1-4, XP031406475.

Wolf I et al: "Three-dimensional annulus segmentation and hybrid visualisation in echocardiography" Computers in Cardiology 2001. Rotterdam The Netherlands, Sep. 23-26, 2001; [Computers in Cardiology], New York, NY: IEEE, US LNKD-DOI:10.1109/CIC.2001.977602, Sep. 23, 2001, 105-108; XP010573227.

* cited by examiner

METHOD AND DEVICE FOR SEGMENTING MEDICAL IMAGE DATA

TECHNICAL FIELD

The present invention relates to a method and a device for segmenting medical images of a non-planar surface of an object, in particular of a cardiac valve, and a computer program product suitable therefore. These methods and devices are particularly suitable for visualizing the valve of the cardiac atrium, in particular the mitral valve, which separates the left atrium of the heart from the left ventricle. For medical imaging, it is important to segment the valvular cusp of the mitral valve, in order to picture abnormalities three-dimensionally, or—during heart-movement—also four-dimensionally.

BACKGROUND

In the state of the art, such segmenting of non-planar surfaces is possible only manually. For example, in the System Philips QLab®, the user of the software must draw in the cusp contours of the valvular cusp of the mitral valve in 9-12 parallel sectional images, which are available in 3D/4D-ultrasound volume data, or can be generated from such data. These manually drawn cusp contours then serve to depict a three-dimensional contour in a three-dimensional view of the respective heart valve.

The manual segmentation of such non-planar surfaces by the user is cumbersome and takes a long time. In addition, it cannot be excluded that the user might detect incorrect contours on the two-dimensional sectional images, which are possibly generated from a three-dimensional image data set (e.g. Ultrasound, CT (computed tomography) or MR (magnetic resonance)), so that the manually detected surfaces may possibly contain errors. In addition, valvular cusps may show up twice on four-dimensional image data sets, i.e. three-dimensional image data sets acquired along a time line. This will happen, if the time resolution during the acquisition is not sufficient to capture a fast cusp movement. When such data sets are processed slice by slice, i.e. on the basis of two-dimensional images, the spatial context gets lost and the contouring of the valvular cusp is inconsistent Finally, the manual segmenting depends strongly on the respective user, so that different results may be expected from the same three- or four-dimensional image data sets, depending on which user has been processing the data sets.

BRIEF SUMMARY

The invention simplifies and automates the segmentation of medical images of a non-planar surface, so that consistent and standardized segmentations can be reached for three-dimensional or four-dimensional data sets, wherein the segmentations approximate reality as exactly as possible. The present invention thereby assumes that the object has already been acquired and has been recorded by means of a three- or four-dimensional image data set, and that the image can be satisfactorily visualized by means of a known 3D volume rendering.

The present invention assumes that the non-planar surface of an object has been acquired by means of a three- or four-dimensional, medical imaging technique, so that a three- or four-dimensional image data set is available. This can be a CT image data set, an MR image data set, or an ultrasound image data set. For example, the software "4D MV Assessment", developed by the applicant, is available for performing a volume-rendering from three- or four-dimensional image data, so that non-planar surfaces, such as the valvular cusps of the mitral valve of the heart, can be depicted well in its closed condition.

A useful method for this is described for example in the German patent application DE 103 39 979. In this method, a pointer in a multi-dimensional data set can be manipulated such that a certain section of the three- or four-dimensional data set can be viewed. For example, the pointer can be aligned perpendicular to the orifice of the mitral valve, so that the valve can be observed quasi "from above". By means of this method, arbitrary sections of an object, i.e. the non-planar surfaces to be examined, can be cut out and further processed with the method of the present invention:

At first, a surface boundary is detected, which delimits the non-planar surface of the object. Afterwards, a model surface is spanned between this surface boundary, which preferably spans the boundary line of the surface boundary in a bee-line, i.e. along the shortest path or paths. This model surface is then corrected by means of distance information, wherein the distance information contains information about the distance(s) between the model surface and the non-planar surface of the object, so that, starting from the model surface, a corrected model surface is generated, which approximates the non-planar surface of the object as exactly as possible. Subsequently, the corrected model surface can be three- or four-dimensionally depicted in known models.

In the depiction/visualization of a heart valve, the non-planar surface usually is composed of at least one first sub-surface (a first mitral cusp) and a second subsurface (a second mitral cusp) which each are curved and are separated from one another by a partition line (closure line of the valvular cusps). Prior to the depiction/visualization, the corrected model surface can then be divided along this partition line in at least two sub surfaces, so that each valvular cusp can be depicted separately.

The surface boundary is in particular a closed line, so that the model surface spans the non-planar surface. According to a preferred embodiment of the present invention, the detection of the surface boundary is carried out with three- or four-dimensional image data sets, by detecting land marks in these data sets automatically. These land marks delimit the non-planar surface and, according to the present invention, are interpolated to a contiguous line.

In the segmentation of the mitral valve of the heart, the annulus, which constitutes a closed surface boundary of the mitral valve, may be automatically detected. This can be realized in different ways: according to one possibility, the annulus is detected by means of a surface-rendering of the three-dimensional volume data set, by detecting the points of greatest curvature on the surface, for example on the left ventricle of the heart, and connecting such points by a contiguous line, so that a closed surface boundary is generated which corresponds essentially to the annulus of the mitral valve. Another possibility is composed of detecting a suitable sectional surface, for example by means of the pointer described in WO 2005/031655, to select the plane orthogonal thereto, and to detect the annulus on this plane by detecting differences in the gray scale values at the border line of the annulus. In addition, rotated sectional images which are positioned around the annulus and perpendicular to the mitral valve may be selected, wherein the intersection points of the annulus with the sectional plane can be selected on the rotated sectional images (so-called land marks). Finally, the annulus can be detected on a long axis view or by means of a combination of the above-described methods.

The model surface is then spanned between this surface boundary, wherein the model surface need not necessarily be planar. However, the model surface connects the points on the surface boundary line preferably along the shortest paths, thus it forms a "stretched skin" or "membrane", which is spanned or stretched by the surface boundary. Of course, the model surface can also be spanned or defined by means of a mathematical function, in particular a second-order, third-order or multiple-order function.

The model surface is subsequently corrected by using distance information (preferably several items of distance information). To do this, the three- or four-dimensional image data sets are used by aligning the three-dimensional volume-rendering of the object essentially perpendicular to the model surface, so that the information about the distance (or the distances at several points) between the model surface and the non-planar surface of the object can be evaluated, until the corrected model surface is generated. According to an embodiment of the invention, the items of distance information are along vectors, which stand on and are oriented essentially perpendicular to the model surface, which is done by evaluating/interpreting a volume-rendering of a three-dimensional image data set of the non-planar surface.

If, for example, the pointer known from DE 103 39 979 A1 is orientated essentially perpendicular to the model surface, the depth map of the volume-renderer will show the distance information between the model surface and the non-planar surface, i.e. for example the valvular cusp of the heart.

According to another preferred embodiment of the present invention, correcting the model surface by means of the distance information is performed iteratively, until the corrected model surface is achieved. It is also possible to obtain the distance information at least partially along vectors which are tilted and stand acute-angled to the model surface, wherein the three-dimensional volume-rendering of the object is then oriented essentially parallel to the tilted vectors, in order to detect, if applicable, surfaces which exhibit back-tapers or undercuts with respect to the model surface and any vector which is aligned essentially perpendicular thereto, as such surfaces may not be iteratively approximated by means of such perpendicular vectors. By means of tilted vectors, it is possible to iteratively approximat such back-tapering surfaces, by—starting from an approximation obtained by means of a perpendicular vector—approximating the thereby corrected model surface further by means of tilted vectors, until the depth maps of such tilted volume-renderings are evaluated.

According to a further preferred embodiment, the corrected model surface is divided prior to depicting/visualization, into the at least two subsurfaces, wherein the partition is done along areas of greatest curvature, along the greatest distances to the model surface, and/or along similar or essentially orthogonal surface normals. Thus, the partition lines between the separate subsurfaces of the non-planar surface are automatically detected, so that these individual subsurfaces can then be visualized/depicted separately. The depiction of these separated, corrected model surfaces can for example be carried out by means of a wire frame model, wherein also the transformation in time of these surfaces can be continually depicted. Thus, one may obtain a depiction of approximated submodel surfaces, which depict movement, e.g. of the mitral valves of the heart, during the heart beat.

The surface boundary of the model surface of the present invention can also be spanned by means of two or more boundary lines, for example if, inside an outer closed surface boundary, there is another, inner closed surface boundary, so that for example a "hole" in the inside arises. The deformed or rather corrected model surface then also contains this "hole", but adapted accordingly to the real contour of the object.

The present invention also relates to a device for segmenting medical images of a non-planar surface of an object, for example a heart valve, having detection means for detecting and determining a surface boundary, which delimits the non-planar surface of the object, further having modelling means for generating a model surface which is spanned between the surface boundary, wherein such modelling means correct the model surface by means of distance information, comprising information about the distance between the model surface and the non-planar surface of the object, until a corrected model surface is generated, and visualizing means for visualizing the corrected model surface.

The device according to the invention also may comprise orienting or aligning means for orienting the three-dimensional volume-rendering of the object, which is essentially perpendicular to the model surface, so that information about the distance between the model surface and the non-planar surface of the object can be evaluated, until the corrected model surface is generated. Such orienting means can also align the three-dimensional volume-rendering of the object acute-angled to the model surface, so that, if applicable, back-tapers or undercuts of the non-planar surface may also be approximated. Such orienting means suitable for the present invention are preferably the means described in DE 103 39 979 A1, which depict a section of interest of the three-dimensional volume-rendering from a certain observer direction, and in addition align the section of interest relative to the model surface, in order to orient the corresponding distance information, i.e. the depth map of the renderer, in correspondence thereto.

The present invention further relates to a computer program product, which contains program code recorded on a computer readable medium, the program code effecting the performance of the method, when the program code is executed on a computer.

BRIEF DESCRIPTION OF THE DRAWINGS

A preferred embodiment of the present invention for the segmentation of in particular valvular cusps in the heart will be explained in more detail with reference to the drawings. In the drawings.

DETAILED DESCRIPTION

Figure 1:
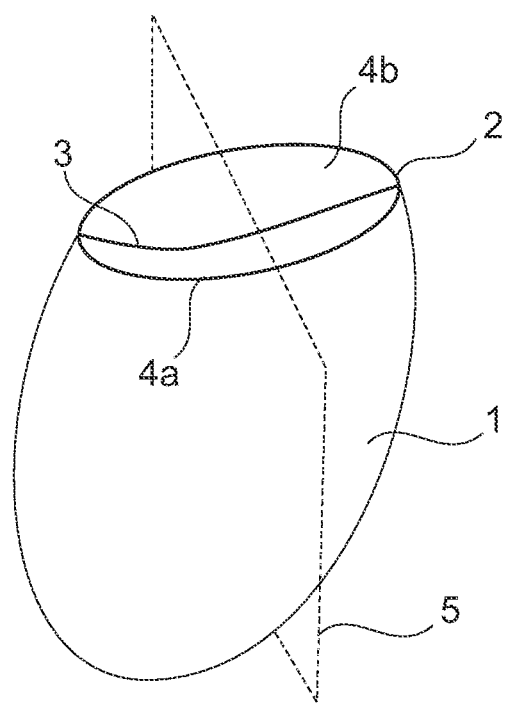
FIG. 1 shows a schematic, three-dimensional view of an object 1 to be examined, with schematically denoted, non-planar surface.

FIG. 1 shows the three-dimensional, schematic side view of for example the left ventricle, with a schematically denoted mitral valve, wherein the aortic valve and further details are not depicted. The mitral valve is one of the two atrium-ventrical valves in the heart and includes essentially two cusps, which are connected to the papillary muscles 6 and thereby to the ventricle by means of tendon filaments 7. The bulge of the mitral valvular cusps downwards into the left ventricle prevents the backward flow of blood into the left atrium, when the left ventricle contracts.

In medical image diagnostics it is of great importance to be able to examine the function of this mitral valve. The two most important diseases of the mitral valve, namely mitral stenosis and mitral valve insufficiency, can be treated if recognized early. For this purpose, this area of the heart is imaged, usually by means of a transoesophageal echocardiography, and three- or four-dimensional image data sets of the mitral valve are acquired. In four-dimensional ultrasound image acquisitions, sectional images through the mitral valves may for example show a mitral valve insufficiency, namely blood leakage flows into the left atrium can be shown by means of these four-dimensional, i.e. moving three-dimensional ultrasound images.

However, up to now it is not possible to automatically separate the mitral valvular cusps separately and three-dimensionally divided from one another, in order to examine their movement separately and over their entire expansion, which, however, would be particularly important for the exact localisation of leakage flows or malformations.

The present invention allows such automatic segmentation of the two valvular cusps of the mitral valve, by imaging the object 1, for example the left ventricle, by means of for example a transoesophageal echocardiography. From these three- or four-dimensional image data sets, a surface boundary 2 may be extracted which—as shown in FIG. 1—represents the annulus of the mitral valve. The mitral valve thereby includes a first curved subsurface 4a and a second curved subsurface 4b, which are separated by means of a partition line 3. The partition line 3 represents the closure line, i.e. the area which seals the left ventricle to the left atrium.

Figure 2:
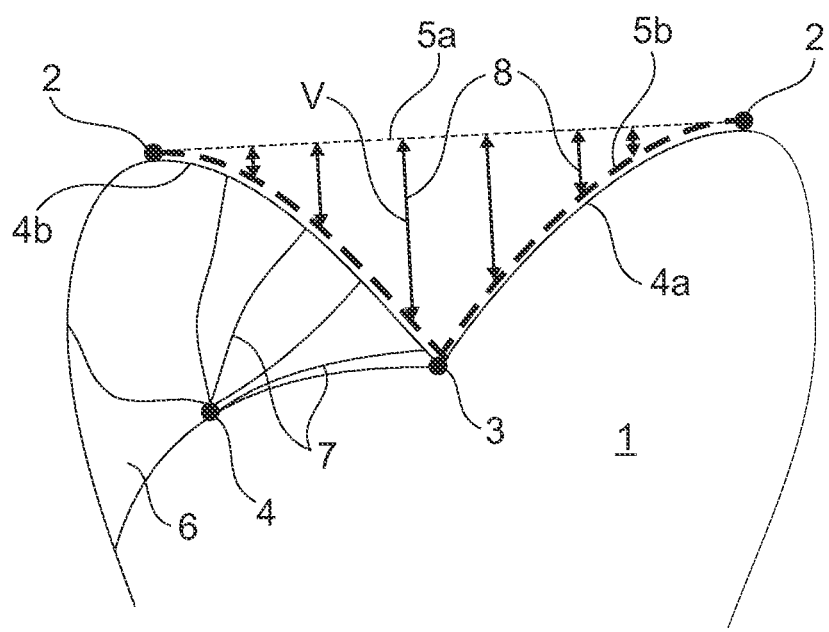
FIG. 2 shows the section S through the schematic view of FIG. 1.

FIG. 2 shows a sectional view S of a section through the schematic, three-dimensional view of FIG. 1 in the upper part of object 1, which has two curved sub-surfaces 4a and 4b between the surface boundary 2 and the partition line 3. Based on a three-dimensional volume-rendering, the surface boundary 2 shown in FIG. 1 is automatically detected, for example by detecting land marks or points having particularly high curvature in the upper part of object 1, and connecting these points by means of interpolation to form a contiguous boundary line. Subsequently, the model surface 5a is spanned between this surface boundary 2. The model surface 5a is then corrected by means of distance information 8, wherein this distance information 8 contains information about the distance between the model surface 5a and the non-planar surface 4 of the object 1. For example by iterative approximation of the model surface 5a along a depth vector V standing essentially perpendicular to the model surface 5a, the model surface 5a can be adjusted to the non-planar subsurfaces 4a and 4b.

The model surface 5a is practically deformed, so that in the end, it corresponds to the geometry of the non-planar subsurfaces 4a and 4b. In order to do this, the volume-rendering is aligned so that the depth vector V is oriented essentially perpendicular to the model surface 5a. In this case, the depth map of the volume-renderer can be used to provide the distance information 8, which automatically furnishes the position of the non-planar or curved surfaces 4a, 4b to the model surface 5a, so that the model surface 5a approximates towards a corrected model surface 5b.

Figure 3A:
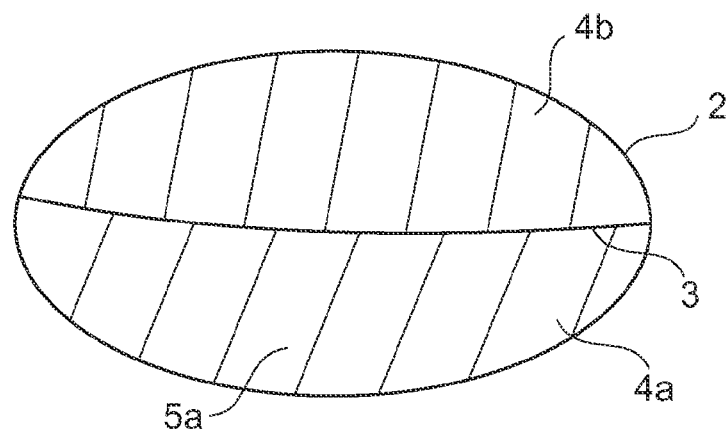
FIG. 3a shows a schematic plan view of a model surface.
Figure 3B:
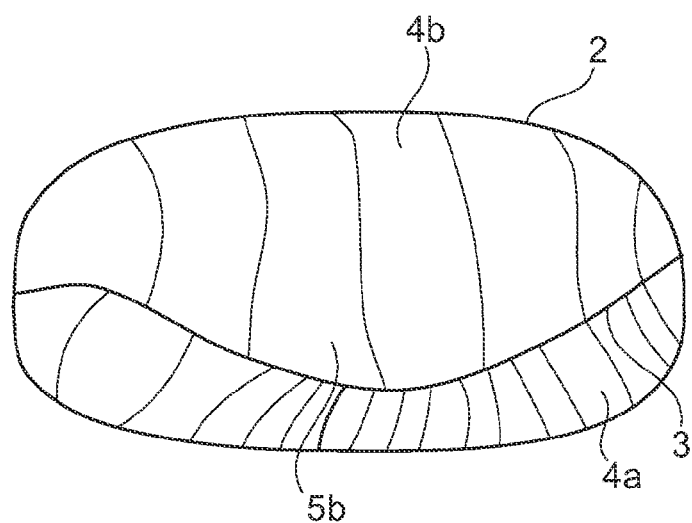
FIG. 3b shows a schematic plan view of a corrected model surface.

FIG. 3a shows the model surface 5a spanned by the surface boundary 2 above the subsurfaces 4a and 4b and the partition line 3. FIG. 3b shows the corrected model surface 5b, as approximated at the end of the method according to the invention, which now has been deformed along the curved subsurfaces 4a and 4b.

Figure 4:
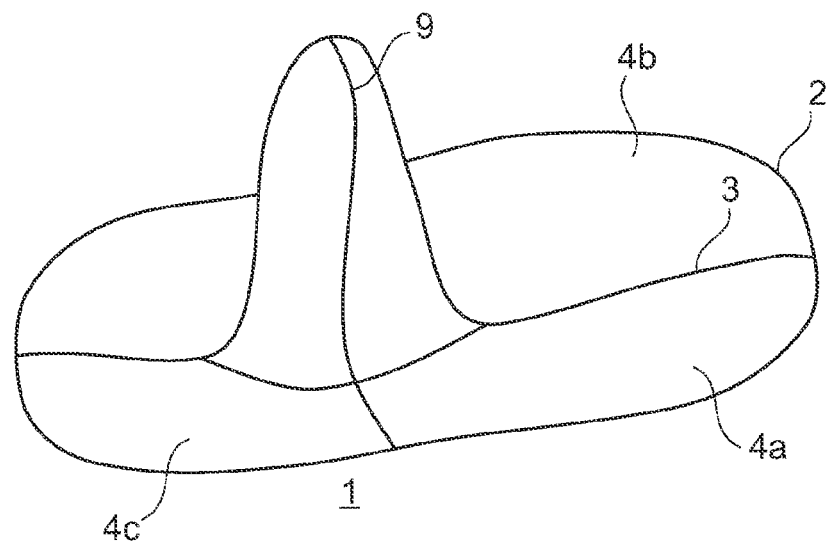
FIG. 4 shows a schematic, three-dimensional view of a mitral valve prolapse.

FIG. 4 shows a disease of the mitral valve, namely a mitral valve prolapse, which leads to the formation of essentially three subsurfaces, when a part of the first subsurface 4a, i.e. one of the valvular cusps, bulges into the left atrium, so that a third curved subsurface 4c arises, which is divided from the first curved subsurface 4a by means of a second parting line 9.

Figure 5:
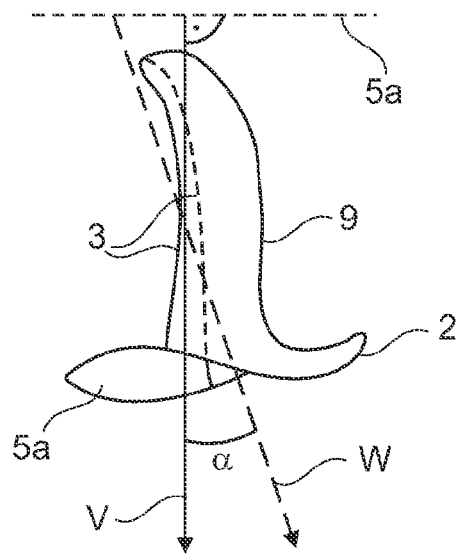
FIG. 5 shows a side view of the mitral valve prolapse of FIG. 4 having an undercut non-planar surface.

FIG. 5 schematically shows a side view of the mitral valve prolapse of FIG. 4, wherein the model surface 5a is shown only schematically also at the upper end of the depth vector V. In reality, it is positioned between the surface boundary 2. If such model surface 5a was corrected merely along depth vectors V, which are essentially perpendicular, errors would arise if the curved subsurface had undercuts or back-taperings as shown schematically in FIG. 5. To this end, the invention suggests to correct the model surface 5a along tilted vectors W, which stand acute-angled to the model surface 5a, wherein the three-dimensional volume-rendering of the object 1 is then also oriented essentially parallel to these tilted vectors W. Thus, the model surface 5a should be at first approximated by means of essentially perpendicular depth vectors V, in order to analyze in further iterative adaptation steps whether possible undercuts are found based on acute-angled tilted vectors W, into which undercuts the model surface 5a may then be further corrected into.

As soon as the corrected model surface 5b has been generated, the separate subsurfaces 4a, 4b, 4c can be separated, for example by using standard methods for separating (i.g. silhouette detection). For this purpose, the depth gradient and/or the similarity of the surface normal is analyzed. Alternatively, the portions of greatest curvature on the corrected model surface 5b may be detected and suitably marked. By connecting these points, the partition lines 3 and possibly 9 are generated, and the subsurfaces thus obtained can then be separately depicted. For example, the second curved subsurface 4b, which is spanned by a part of the surface boundary 2 and the partition line 3, may be depicted in a wire frame model of the heart and can be shown four-dimensionally, i.e. in motion. By means of two-dimensional or three-dimensional tracking, the thus-segmented structures (for example points of the wire frame) can be traced over the complete heart cycle, and thereby a dynamic depiction of the separate, curved subsurfaces, i.e. of the valvular cusps, for example of the mitral valve of the heart, is obtained.

Generally, a tracking of the wire frame points is useful, since in an image-based tracking, a correct allocation of the separate points to be tracked cannot always be reliably ensured.

In addition, it is possible to detect additional land marks L, as for example the apexes of the papillary muscles 6 shown in FIG. 2, or the ends of the tendon filaments 7, so that the land marks L thus-obtained may be dynamically depicted together with subsurfaces in a wire frame model. Thereby, the complete valve apparatus in its dynamic movement can be three-dimensionally depicted.

By means of the present invention, the cumbersome user interactions necessary so fare are dispensed with, as well as the error sources connected therewith. Even in case a completely automized segmentation is not possible because of insufficient quality of the data, at least the user interaction is shortened by processing the data in accordance with the present invention.

The invention claimed is:
1. A method for segmenting medical images of a non-planar surface of an object, the medical images being available as three or four-dimensional image sets, the method comprising the following steps:

detecting a surface boundary in three- or four-dimensional image data sets, which delimits the non-planar surface of the object, creating a model surface, which is spanned between the surface boundary, correcting the model surface by means of distance information, which contains information about distance(s) between the model surface and the non-planar surface of the object, until a corrected model surface is generated, wherein correcting the model surface by means of distance information is carried out by orienting a three-dimensional volume-rendering of the object essentially perpendicular or acute-angled to the model surface, wherein the volume renderer performing the volume rendering produces a depth-map, which is used to provide the distance information between the model surface and the non-planar surface of the object, and depicting the corrected model surface, wherein the correction of the model surface by means of the distance information is carried out iteratively, until the corrected model surface is generated, and the distance information is at least partially obtained along tilted vectors which are acute-angled to the model surface, wherein the three-dimensional volume-rendering of the object is then oriented essentially parallel to the tilted vectors.

2. The method of claim 1, wherein the non-planar surface comprises at least one first subsurface and a second subsurface, which each are curved and separated from each other by means of a partition line, and wherein the corrected model surface is separated along the partition line into the at least two sub-surfaces prior to the depiction.

3. The method of claim 1, wherein the surface boundary is a closed line, so that the model surface spans the non-planar surface.

4. The method according to claim 1, wherein the detection of the surface boundary is done by detecting land marks which delimit the non-planar surface and by interpolating these land marks to a contiguous line.

5. The method according to claim 1, wherein the correction of the model surface by means of distance information is carried out by orienting a three-dimensional volume-rendering of the object essentially perpendicular to the model surface, so that the information about the distance between the model surface and the non-planar surface of the object can be evaluated, until the corrected model surface is generated.

6. The method according to claim 1, wherein the distance information is gained along vectors standing essentially perpendicular to the model surface, by evaluating a volume rendering of a three-dimensional image data set of the non-planar surface accordingly.

7. The method to claim 1, wherein the corrected model surface is separated prior to the depiction into the at least two sub-surfaces, wherein the separation is carried out along areas of greatest curvature, greatest distance to the model surface and/or along similar or essentially orthogonal surface normals.

8. The method of claim 7, wherein the depiction of the separated, corrected model surfaces is carried out by means of a wire frame model, wherein also a transformation in time of these surfaces is continually depicted.

9. A non-transitory computer program product, containing program code stored on a non-transitory computer readable medium, the program code effecting the performance of a method when the program code is executed on a computer, the method comprising:

detecting a surface boundary in three- or four-dimensional image data sets, which delimits the non-planar surface of an object, creating a model surface, which is spanned between the surface boundary, correcting a surface of the model by means of distance information, which contains information about distance(s) between the model surface and the non-planar surface of the object, until a corrected model surface is generated, wherein correcting the model surface by means of distance information is carried out by orienting a three-dimensional volume-rendering of the object essentially perpendicular or acute-angled to the model surface, wherein the volume renderer performing the volume rendering produces a depth-map, which is used to provide the distance information between the model surface and the non-planar surface of the object, and depicting the corrected model surface, wherein the correction of the model surface by means of the distance information is carried out iteratively, until the corrected model surface is generated, and the distance information is at least partially obtained along tilted vectors which are acute-angled to the model surface, wherein the three-dimensional volume-rendering of the object is then oriented essentially parallel to the tilted vectors.

10. A computer for segmenting medical images of a non-planar surface of an object by executing program code stored in a non-transitory computer-readable medium, the segmenting of the medical images performed according to a method comprising:

detecting, by the computer, a surface boundary in three- or four-dimensional image data sets, which delimits the non-planar surface of the object, creating, by the computer, a model surface, which is spanned between the surface boundary, correcting, by the computer, a surface of the model by means of distance information, which contains information about distance(s) between the model surface and the non-planar surface of the object, until a corrected model surface is generated, wherein correcting the model surface by means of distance information is carried out by orienting a three-dimensional volume-rendering of the object essentially perpendicular or acute-angled to the model surface, wherein the volume renderer performing the volume rendering produces a depth-map, which is used to provide the distance information between the model surface and the non-planar surface of the object, and depicting, by the computer, the corrected model surface, wherein the correction of the model surface by means of the distance information is carried out iteratively, until the corrected model surface is generated, and the distance information is at least partially obtained along tilted vectors which are acute-angled to the model surface, wherein the three-dimensional volume-rendering of the object is then oriented essentially parallel to the tilted vectors.

* * * * *